J. J. BEYER.
DEVICE FOR BENDING CHAIN LINKS.
APPLICATION FILED FEB. 4, 1920.
1,387,880.
Patented Aug. 16, 1921.
2 SHEETS—SHEET 1.
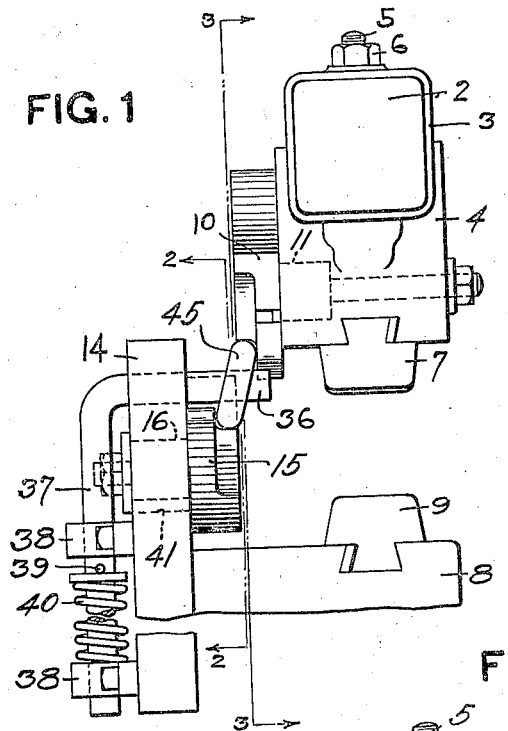
FIG. 1
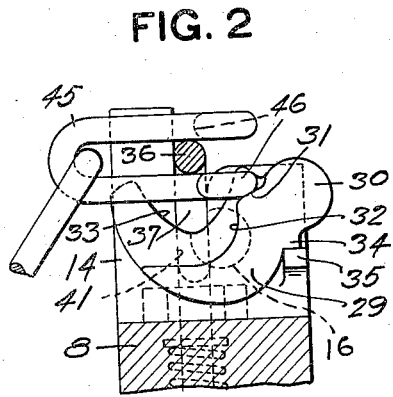
FIG. 2
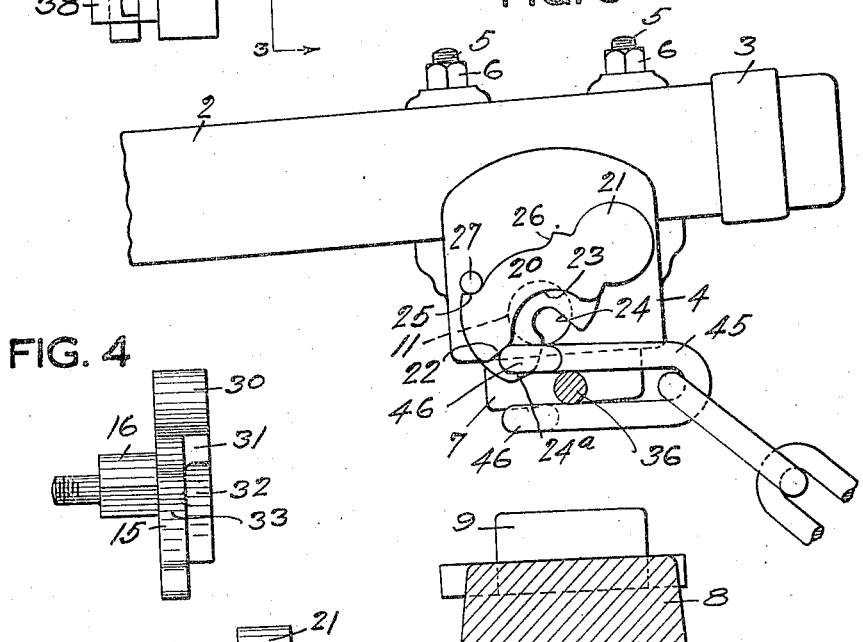
FIG. 3
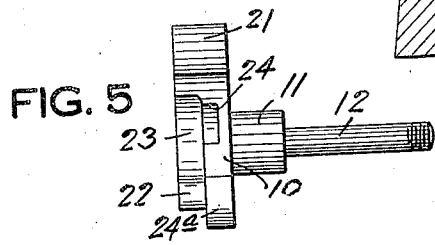
FIG. 4
FIG. 5
INVENTOR.
Jacob J. Beyer
By Kay & Totten
Attorneys J. J. BEYER.
DEVICE FOR BENDING CHAIN LINKS.
APPLICATION FILED FEB. 4, 1920.
1,387,880.
Patented Aug. 16, 1921.
2 SHEETS—SHEET 2.
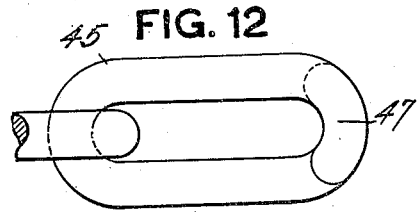
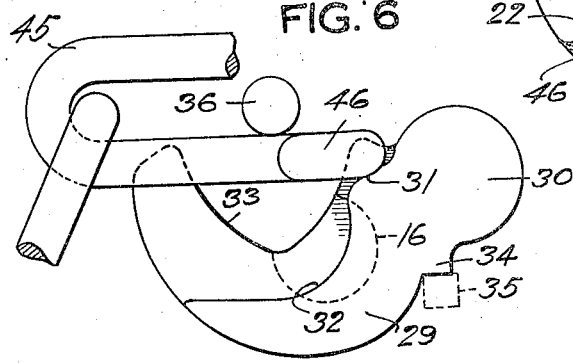
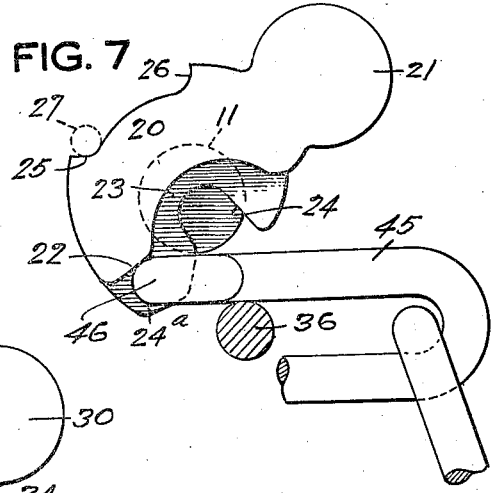
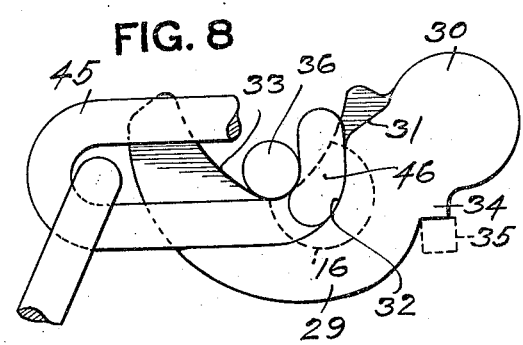
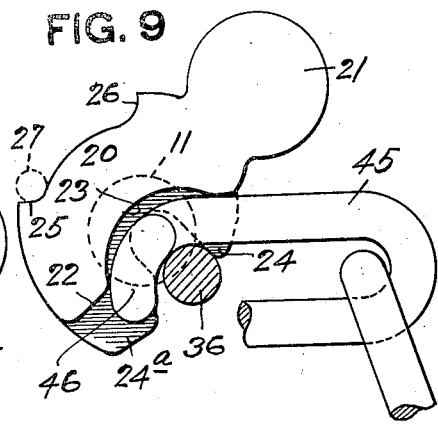
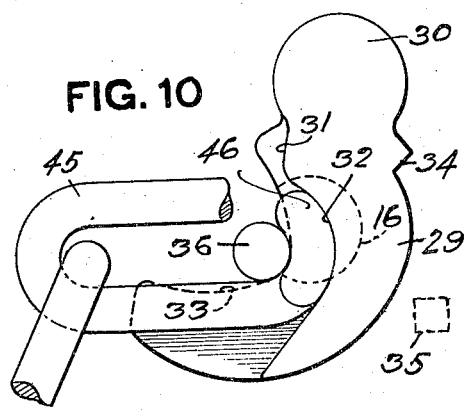
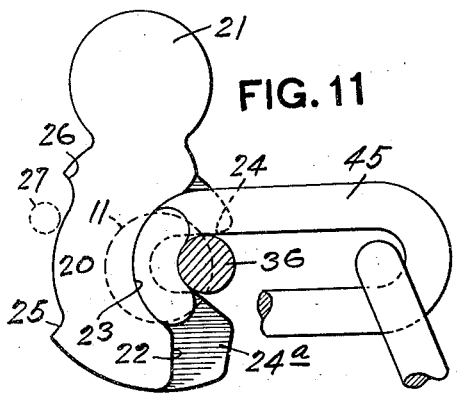
INVENTOR
Jacob J. Beyer
By Roy & Totten,
Attorneys

UNITED STATES PATENT OFFICE.

JACOB J. BEYER, OF McKEES ROCKS, PENNSYLVANIA.

DEVICE FOR BENDING CHAIN-LINKS.

1,387,880.

Specification of Letters Patent.    Patented Aug. 16, 1921.

Application filed February 4, 1920. Serial No. 356,341.

*To all whom it may concern:*

Be it known that I, JACOB J. BEYER, a citizen of the United States, and resident of McKees Rocks, in the county of Allegheny and State of Pennsylvania, have invented a new and useful Improvement in Devices for Bending Chain-Links; and I do hereby declare the following to be a full, clear, and exact description thereof.

My invention relates to chain-making apparatus, and it has special reference to apparatus for bending the links of heavy chains preparatory to welding.

One object of my invention is to provide a device for bending chain links preparatory to welding which shall be simple in construction, effective in operation, and capable of being readily attached to the ordinary forms of power hammers that are now used for welding purposes.

A further object of my invention is to provide a device of the character indicated which shall accomplish by mechanical means the operation of bending heavy chain links, which operation has heretofore been practically performed only by manual labor.

One embodiment of my invention is illustrated in the accompanying drawings, in which Figure 1 is a front elevational view of a portion of a power hammer with my invention applied thereto; Fig. 2 is a side view, partly in elevation and partly in section, showing the lower bending die and its attachments as seen from the right of Fig. 1, the section being taken substantially along the line 2—2, Fig. 1; Fig. 3 is a side elevational view of the hammer and the upper bending die, as seen from the left of Fig. 1, the anvil block being shown in section along the line 3—3, Fig. 1; Fig. 4 is a top plan view of the lower bending die when in the position shown in Fig. 2; Fig. 5 is a bottom plan view of the upper bending die, when in the position shown in Fig. 3; Figs. 6 and 7 are diagrammatic side views showing the positions of the upper and lower bending dies, respectively, at the beginning of the bending operation; Figs. 8 and 9 are similar diagrammatic side views showing the positions of the dies at the end of the first stage of the bending operation, when the dies are about to turn; Figs. 10 and 11 are similar diagrammatic side views showing the positions of the dies at the end of the bending operation; and Fig. 12 is a plan view of a link after it has been bent by means of my device and is ready for welding.

Chains of the largest sizes are made from stock which may be as large as two or three inches in diameter and the final bending operation, by means of which the ends are overlapped ready for welding, is a matter of special difficulty on account of the weight of the material and also on account of the fact that the forge in which the links are heated before bending and welding must be located very close to the welding hammer, so that there is but little room for the installation of bending apparatus near the hammer. It is out of the question to bend links at any great distance from the hammer on account of the great weight of the completed chain, each link of which may weigh 40 or 50 pounds. For these reasons, it has not been found possible to employ any of the bending machines which have been proposed heretofore for bending chain links and which have consisted of organized machines, the installation of which would require a considerable amount of space. Accordingly, it has been the universal shop-practice to bend chain links of the kind here in question by means of manual labor, three helpers with sledge hammers being continuously occupied in bending the links for one chain-maker.

According to my present invention, I provide an effective link-bending device which utilizes the power of the descending hammer for producing the bend. This principle I believe to be new, and it has the advantage that gearing and other driving means are entirely eliminated. My device, generally stated, consists in a pair of pivotally mounted bending dies, one of which is carried by the hammer and both of which, on the downward stroke of the hammer, co-operate to bend the ends of the link around a forming mandrel which is mounted by the side of the block or anvil. The bending dies and the mandrel, with the necessary supports for the mandrel and for one of the dies, constitute all of the mechanism which is required for the mechanical bending of the heaviest links.

For a more detailed description of my invention reference may now be had to the accompanying drawings. Figs. 1 and 3 show a portion of a power hammer of the helve type comprising a helve or beam 2, a reinforcing metal strap 3 and a shoe 4 which is secured to the under side of the helve 2 by means of bolts 5 and nuts 6 and which carries the hammer 7. A block 8 is disposed beneath the hammer head and carries an anvil 9. The parts thus far described are such as are found in well-known power hammers, and it is to be understood that my invention may be applied to any form of power hammer, whether it be a helve hammer, a trip hammer, or other reciprocating form.

The shoe 4 of the hammer head carries a bending die 10 which is provided with a trunnion 11 that is integral with the die 10 and is secured to a rod or bolt 12 which extends through the shoe 4 of the hammer head and may be secured in place by any suitable means. A standard 14 is attached to the block 8 at a point opposite to the hammer head and carries the lower bending die 15 which is provided with a trunnion 16 that extends through the standard 14 and has a stud, nut or the like for securing the die and trunnion in place.

The upper bending die 10, as shown in Figs. 3 and 5, consists of a substantially semi-circular body portion 20, an unbalanced weight 21 and a hammer portion 22 for initially engaging the upper arm of the link to be bent. In line with the hammer portion 22 is a curved bending surface 23 beside which is formed an irregularly shaped cam surface including straight shoulders 24 and 24ª at its ends. The upper edge of the die is cut away to form shoulders 25 and 26 which are adapted to engage a pin 27 carried by the shoe 4 and thereby limit the rotation of the die.

The lower bending die 15 consists, like the upper bending die, of a curved body portion 29, a weight 30, a hammer portion 31, a curved bending surface 32 in line with the hammer portion 31, and a curved cam surface 33, which is disposed beside the bending surface 32, but is of different curvature. The lower die is also provided with a stop shoulder 34 that is adapted to engage a pin or lug 35 carried by the standard 14.

Disposed adjacent to the bending dies 10 and 15, and adapted to be engaged by both of them, is a horizontal forming mandrel which, as shown, consists of a bar that is bent at right angles to form a horizontal mandrel portion 36 and a vertical supporting portion 37. The vertical portion 37 of the forming mandrel extends downwardly through openings in brackets 38 which are secured to the standard 14. Between the lower bracket 38 and a pin 39 that is carried by the vertical portion 37 is a helical spring 40 which serves to keep the mandrel normally in its uppermost position, but which permits the mandrel to yield under the impact of the upper bending die. In order to permit this movement of the mandrel, the standard 14 is provided with a vertical slot 41. The diameter of the mandrel is approximately the same as the distance between the parallel sides of the links to be bent, and a number of mandrels of different diameters are suitably provided for each machine, in order to readily change from one size of links to another.

For the operation of my device, reference may be had to Figs. 2, 3 and 6 to 11, inclusive. At the beginning of the operation, the hammer being raised, a link 45 which has previously been bent into U-shape and has its ends scarfed as at 46, is placed with one of its ends above and one below the mandrel. As shown in Fig. 1, the link is somewhat canted in order that the ends of the link, when bent, may properly overlap each other. The relative starting positions of the mandrel, the link and the lower bending die are shown in Fig. 6 and it will be observed that the end of the lower arm of the link rests upon the hammer portion 31 of the lower die. The hammer is now caused to descend, carrying with it the upper bending die, the hammer portion 22 of which strikes the end of the upper arm of the link as shown in Figs. 3 and 7. The blow delivered by the upper bending die imparts a preliminary bend to the ends of the link, the dies being prevented from rotating by their engagement with the pins 27 and 35, so that the dies act substantially like hammers until the ends of the link are bent to the extent shown in Figs. 8 and 9. From these figures it will be seen that the ends of the link have been bent sufficiently to slip off the hammer portions of the bending dies and that the dies are therefore free to rotate about their pivots. The rotation of the upper link is produced by engagement between the cam shoulder 24 of the upper bending die and the mandrel 36. The parts are so proportioned that this engagement takes place at about the time when the dies are left free to rotate. Upon further descent of the hammer, the upper die 10 is rotated upon its axis in a counter-clockwise direction, as seen in Fig. 9, since the point of engagement between the mandrel and the shoulder 24 is eccentric with respect to the axis of rotation of the die. The upper die finally assumes the position shown in Fig. 11, its movement of rotation causing the end of the link to be bent around the mandrel, as shown.

The downward thrust of the hammer is sufficient not only to cause the upper bending die to rotate, but also to cause the mandrel to descend against the pressure of the spring 40. As the mandrel descends, it operates through the cam surface 33 of the lower die to rotate the lower bending die around its axis from the position shown in Fig. 8 to the position in Fig. 10, and thereby the lower arm of the link is bent around the mandrel.

As the hammer moves upward, the mandrel also rises under the pressure of the spring 40 and thus acts upon the cam surfaces 24ª and 33 of the upper and lower dies to rotate them in the directions opposite to their bending movements, whereupon the dies assume their original positions and are held in their starting positions by means of their eccentric weights 21 and 30.

Fig. 12 shows the link 45 with its upper and lower arms overlapping at 47, in which condition the link is ready to be welded, the welding being done by means of the hammer 7 or otherwise.

While I have herein shown and described a preferred embodiment of my invention, it is to be understood that numerous changes in the form and arrangement of parts may be made within the scope thereof, and I therefore desire that no limitations be imposed upon my invention except such as are indicated in the appended claims.

What I claim is:

1. Chain-making apparatus comprising a welding hammer, a horizontal forming mandrel resiliently mounted adjacent to the said hammer and pivotally movable bending means carried by the said hammer and adapted to coöperate with the said forming mandrel to bend chain-links preparatory to welding.

2. Chain-making apparatus comprising a welding hammer, a forming mandrel disposed adjacent to the said hammer, and a pair of pivotally mounted bending dies one of the said dies being carried by the said hammer and the other die being disposed adjacent to the said mandrel, the said dies being adapted to coöperate with the said forming mandrel to bend chain-links preparatory to welding.

3. Chain-making apparatus comprising a welding hammer, a forming mandrel disposed adjacent to the said hammer, and a bending die carried by the said hammer and adapted to coöperate with the said forming mandrel to bend chain-links preparatory to welding, the said die having a curved working face and being adapted to be rotatively moved by engagement with the said forming mandrel.

4. Chain-making apparatus comprising a welding hammer, a forming mandrel disposed adjacent to the said hammer, and a pair of bending dies, one of the said dies being carried by the said hammer and the other die being disposed adjacent to the said mandrel, the said dies being adapted to coöperate with the said forming mandrel to bend chain-links preparatory to welding, each of the said dies having a curved working face and being adapted to be rotatively moved by engagement with the said forming mandrel.

5. Chain-making apparatus comprising a welding hammer, a forming mandrel disposed adjacent to the said hammer, a pair of rotatably movable bending dies, one of the said dies being carried by the said hammer and the other die being disposed adjacent to the said forming mandrel, and means for preventing the said dies from rotating at the beginning of the bending operation and for thereafter rotatively moving the said dies to complete the bending operation.

6. Chain-making apparatus comprising a welding hammer, a forming mandrel disposed adjacent to the said hammer, a pair of rotatably movable bending dies, one of the said dies being carried by the said hammer and the other die being disposed adjacent to the said forming mandrel, means for preventing the said dies from rotating at the beginning of the bending operation and means for thereafter causing the said dies to move rotatively to complete the bending operation, the said rotative movement being imparted to the said dies through engagement between the said dies and the said forming mandrel.

7. A bending die having a hammer surface adapted to deliver preliminary bending blows to the work and a bending surface, disposed adjacent to the said hammer surface, for imparting a further bend to the work.

8. A bending die having a hammer surface adapted to deliver preliminary bending blows to the work, a bending surface, disposed adjacent to the said hammer surface, for imparting a further bend to the work, and a cam surface whereby the said die may be rotatively moved.

9. A bending die having a hammer surface adapted to deliver preliminary bending blows to the work, a bending surface, disposed adjacent to the said hammer surface, for imparting a further bend to the work, a cam surface whereby the said die may be rotatively moved and means for limiting the rotative movement of the said die.

10. A bending die comprising a rotatively movable body portion provided with a weight eccentric to its axis of rotation, the said body portion having a hammer surface, means for preventing rotation of the said die when the said hammer surface is in engagement with the work, a curved bending surface in line with the said hammer surface, and a cam surface, disposed adjacent to the said bending surface, for imparting rotative movement to the said die.

In testimony whereof, I, the said JACOB J. BEYER, have hereunto set my hand.

JACOB J. BEYER.

Witnesses:
R. D. BROWN,
JOHN F. WILL.